(12) United States Patent
Watanabe

(10) Patent No.: US 8,729,465 B2
(45) Date of Patent: May 20, 2014

(54) VACUUM MEASUREMENT DEVICE WITH ION SOURCE MOUNTED

(75) Inventor: Fumio Watanabe, Ibaraki (JP)

(73) Assignee: Vaclab Inc., Ibaraki (JP)

( * ) Notice: Subject to any disclaimer, the term of this patent is extended or adjusted under 35 U.S.C. 154(b) by 0 days.

(21) Appl. No.: 13/496,005

(22) PCT Filed: Sep. 28, 2010

(86) PCT No.: PCT/JP2010/067317
§ 371 (c)(1),
(2), (4) Date: Mar. 14, 2012

(87) PCT Pub. No.: WO2011/040625
PCT Pub. Date: Apr. 7, 2011

(65) Prior Publication Data
US 2012/0241604 A1    Sep. 27, 2012

(30) Foreign Application Priority Data

Sep. 29, 2009  (JP) .................................. 2009-224918
Nov. 17, 2009  (JP) .................................. 2009-261826

(51) Int. Cl.
*H01J 27/20*   (2006.01)
*H01J 49/14*   (2006.01)
*H01J 3/26*    (2006.01)

(52) U.S. Cl.
USPC ............................ 250/294; 250/427; 324/460

(58) Field of Classification Search
USPC .................. 250/294; 324/460, 462, 464, 427
See application file for complete search history.

(56) References Cited

U.S. PATENT DOCUMENTS

| | | | |
|---|---|---|---|
| 6,566,884 B2 * | 5/2003 | Rutherford et al. | 324/460 |
| 2003/0057953 A1 * | 3/2003 | Rutherford et al. | 324/460 |
| 2005/0030044 A1 * | 2/2005 | Correale | 324/460 |
| 2005/0140375 A1 * | 6/2005 | Liu | 324/460 |
| 2006/0202701 A1 * | 9/2006 | Knapp et al. | 324/460 |
| 2006/0226355 A1 * | 10/2006 | Watanabe et al. | 250/294 |
| 2006/0261819 A1 * | 11/2006 | Liu et al. | 324/464 |
| 2007/0278928 A1 * | 12/2007 | Lee et al. | 313/420 |
| 2009/0095616 A1 * | 4/2009 | Lu | 204/192.1 |
| 2009/0096460 A1 * | 4/2009 | Watanabe et al. | 324/462 |
| 2010/0090703 A1 * | 4/2010 | Boardwine et al. | 324/464 |
| 2012/0169347 A1 * | 7/2012 | Wei et al. | 324/459 |

FOREIGN PATENT DOCUMENTS

| | | |
|---|---|---|
| JP | 03-131735 A | 6/1991 |
| JP | 07-294487 A | 11/1995 |
| JP | 08-233677 A | 9/1996 |

* cited by examiner

*Primary Examiner* — Michael Logie
*Assistant Examiner* — Wyatt Stoffa
(74) *Attorney, Agent, or Firm* — Kubotera & Associates, LLC

(57) ABSTRACT

A vacuum measurement device includes a grid (10) and an electron source (20) provided inside a vacuum vessel, and an ion beam (100) extracted outside the grid is captured by an ion collector (40) and is converted into a current signal. The grid (10) is a grid-shaped cylinder, and an ion outlet (11) is opened and elongated in the longitudinal direction along the side surface of the grid (10). The vacuum measurement device includes a primary ion collector (40) capturing specific ions and a secondary ion collector (50) capturing other ions. The gas molecule density of the ion source is obtained from a total current of the primary and secondary ion collectors, and a ratio of the gas molecule density of the specific ions relative to the gas molecule density is obtained from a ratio of the current of the primary ion collector (40) relative to the total current.

4 Claims, 19 Drawing Sheets

VACUUM MEASUREMENT DEVICE WITH ION SOURCE MOUNTED

TECHNICAL FIELD

The present invention relates to a vacuum measurement device such as, an ionization vacuum gauge, a mass spectrometer, and the like, mounted with an ion source.

BACKGROUND ART

FIG. 18 is an overall configuration diagram illustrating a conventional vacuum measurement device measuring the density (pressure) of a gas remaining inside a vacuum device, and FIG. 19 illustrates a gauge head including an ion source. Further, the gauge head shown in FIG. 19 is also a gauge head of a vacuum gauge called an extractor vacuum gauge.

In FIGS. 18 and 19, an ion source 3' is constituted of three electrodes, that is, a grid 10', an electron source 20, and an ion extractor 30'. In some cases, only two electrodes, that is, a grid 10' and an electron source 20 may be called an ion source. However, in this invention, three electrodes, that is, a grid 10', an electron source 20', and an ion extractor 30' are called the ion source 3'.

In FIG. 19, a gauge head (denoted by the reference numeral 2' of FIG. 18) of an ionization vacuum gauge is configured by additionally providing an ion collector 40' capturing an ion beam 100' to an ion source 3', and the gauge head is used while being connected to a vacuum device (not shown). Further, the ion source 3' of FIG. 18 is controlled by a controller 200'. The ion beam captured by the ion collector 40' is measured as a current I with an ammeter 201', the current I is converted into a pressure P by an arithmetic circuit 202', and then the pressure is displayed on a display device 203'.

Furthermore, in the case of the gauge head of the extractor vacuum gauge shown in FIG. 19, the ion collector 40' is of a needle type in many cases.

The entire part including the electronic circuit is called a vacuum measurement device 1', and FIG. 18 is an example of the ionization vacuum gauge. Further, in FIG. 19, when a quadrupole electrode or a magnetic deflecting mass spectrometer (not shown) is disposed between the ion collector 40' and the ion extractor 30' of the ion source 3', a different vacuum measurement device such as a mass spectrometer or a helium leak detector may be provided.

The conventional ion source 3' shown in FIG. 19 is disposed inside a pipe-shaped vacuum vessel 8' connected to a vacuum device (not shown) in a communication state. In the conventional grid 10' constituting the ion source 3', a cylindrical top surface portion B is blocked by a wire net, and a bottom surface C is opened without being blocked by the wire net. Although the ion extractor 30' having a small hole opened at the center thereof is disposed outside the bottom surface C of the grid 10' (at the underside of the Z axis), the potential of the electrode is generally is set to a ground potential (0 V). For this reason, the electrode is continuously formed with the pipe-shaped vacuum vessel 8' in many cases (Patent Document 1).

PRIOR ART DOCUMENTS

Patent Documents

Patent Document 1: Japanese Patent Application Laid-Open No. 07 (1995)-294487
Patent Document 2: Japanese Patent Application Laid-Open No. 08 (1996)-233677

Patent Document 3: Japanese Patent Application Laid-Open No. 03 (1991)-131735

DISCLOSURE OF THE INVENTION

Problems to be Solved by the Invention

Since the vacuum measurement device such as the ionization vacuum gauge and the mass spectrometer is a measurement device, reliability such as precision and stability is important. In order to improve the precision and the stability, it is necessary to improve the ion passage efficiency at the small hole 31' of the ion extractor 30' when ions generated inside the grid are extracted as the ion beam.

However, in the conventional ion source 3' shown in FIGS. 18 and 19, there are problems in that the ion beam passage efficiency is poor and reliability such as precision and stability is degraded. In particular, when soft X-rays or an electron-stimulated desorption ion (hereinafter, referred to as an "ESD ion") generated on the surface of the grid is incident on the collector inside the ionization vacuum gauge or the mass spectrometer, a noise signal is generated, so that the reliability in measurement is degraded.

The degradation of the ion beam passage efficiency occurs when the ion beam is not focused and collides with the ion extractor 30'. When the hole diameter is increased, there is a dilemma in that noise such as the soft X-rays or the ESD ion increases.

Further, referring to FIG. 19, in the case of an ion generated across A-B including a large amount of ESD ions and a gas-phase ion generated across A-C, there is a difference in kinetic energy of the obtained ion beams 100'. Accordingly, when an energy analyzer is used, the ESD ion noise may be distinguishable. As an example, an ionization vacuum gauge including a cylindrical mirror energy analyzer is disclosed (Patent Document 2).

However, the ion passage efficiency of the Patent Document 2 is extremely poor, and the sensitivity is not sufficient when measuring the vacuum of $10^{-9}$ Pa or less.

Further, as another example, in order to improve the ion passage efficiency of the ion beams, a vacuum measurement device of an ion extractor type ionization vacuum gauge is disclosed which includes a coaxial cylindrical analyzer having a deflecting angle from 250° to 260° where an angle aberration and a velocity aberration of an ion beam becomes zero (Patent Document 3). Since the vacuum measurement device is in extremely large size, this device is not practical.

As described above, in the vacuum measurement device using the conventional ion source 3' shown in FIG. 19, the energy dispersion of the obtained ion beam is large, and the ion beam may not be focused. For this reason, the ion passage efficiency (sensitivity) of the ion extractor 30' is degraded, and noise such as the soft X-rays or the ESD ion from the grid is mixed with the ion beam, so that it is difficult to measure the vacuum of 10−9 Pa or less.

It is necessary to devise an ion source with a structure making energy dispersion of the ion beam small and making noise such as the soft X-rays or the ESD ion difficult to enter the ion beam, and further to provide a vacuum measurement device such as a mass spectrometer or an ionization vacuum gauge mounted with such ion source, thereby to be capable of measuring a vacuum of 10−9 Pa or less with high precision.

The invention is made in view of such circumstances, and it is an object of the invention to provide a vacuum measurement device of a gas leak detector also serving as a mass spectrometer capable of detecting a specific gas component while having a highly precise ionization vacuum gauge (entire pressure measurement function).

SUMMARY OF THE INVENTION

The configuration of the invention will be described by using the reference numerals used in an embodiment of the convention.

With the invention according to claim 1, there is provided a vacuum measurement device comprising: a grid (10) and an electron source (20) provided inside a vacuum vessel, wherein electrons emitted from the electron source ionize gas molecules flying into the grid (10), the obtained ions are extracted as an ion beam (100) from an ion outlet (11) of the grid by an ion, extractor electrode (30), and the ion beam (100) is captured by an ion collector (40) and is converted into a current signal, wherein the grid (10) is a substantially circular columnar cylinder or a polygonal columnar cylinder is a shape more than pentagonal that is formed in a grid shape so that the electrons emitted from the electron source pass therethrough, the ion outlet (11) is opened to be elongated in the longitudinal direction along the side surface of the grid (10), and the ion outlet (11) is formed so that the longitudinal length of the opening is equal or substantially equal to the longitudinal length of the side surface of the grid (10), and wherein the ion extractor (30) includes an ion beam passage slit (31) through which the ion beam (100) passes, the ion beam passage slit (31) is formed so that the shape is the same or substantially the same as that of the ion outlet (11), the ion outlet (11) and the ion beam passage slit (31) are disposed to face each other with a gap therebetween, the ion collector (40) is formed so that the shape is the same or substantially the same as that of the ion beam passage slit (31), and the ion beam passage slit (31) and the ion collector (40) are disposed to face each other with a gap therebetween so that their shapes match to each other.

With the invention according to claim 2, there is provided the vacuum measurement device according to claim 1, wherein a deflector (38) electrostatically deflecting the ion beam is disposed between the ion source (3) and the ion collector (40), so that the axis of the cylinder of the grid (10) and an axis of the deflector (38) are disposed to be parallel to each other.

With the invention according to claim 3, there is provided a vacuum measurement device comprising: a grid (10) and an electron source (20) provided inside a vacuum vessel, wherein electrons emitted from the electron source are vibrated inside and outside the grid (10) to ionize gas molecules flying into the grid (10), ions formed by ionizing the gas molecules are extracted as an ion beam (100) outside the grid by an ion extractor electrode (30) from an ion outlet (11) provided in the grid (10), and the ion beam (100) is captured by an ion collector (40) and is converted into a current signal, wherein the extracted ion beam (100) is led to a magnetic field space, and the ions are separated in accordance with a mass-to-charge ratio using Lorentz's force generated when the ions travel the magnetic field space, wherein the ion collector includes a primary ion collector (40) that is disposed at a position where the specified ions among the separated ions are converged, and a secondary ion collector (50) that captures ions other than the specified ions, and wherein a gas molecule density of the ion source is obtained from a total current obtained by adding a current of the primary ion collector (40) and a current of the secondary ion collector (50), and a ratio of the gas molecule density of the specified ions with respect to the gas molecule density is obtained from a ratio of the current of the primary ion collector (40) included in the total current.

With the invention according to claim 4, there is provided the vacuum measurement device according to claim 3, wherein a surface of the secondary ion collector (50) capturing ions other than the specified ions is three-dimensionally provided to surround an orbit formed by the ion beam of the specified ions.

With the invention according to claim 5, there is provided the vacuum measurement device according to claim 3 or 4, wherein the grid (10) is a substantially circular columnar cylinder or a polygonal columnar cylinder in a shape more than a pentagonal that is formed in a grid shape so that the electrons emitted from the electron source pass therethrough, the ion outlet (11) is opened to be elongated in the longitudinal direction along the side surface of the grid (10), and the ion outlet (11) is formed so that the longitudinal length of the opening is equal or substantially equal to the longitudinal length of the side surface of the grid (10), and wherein the ion extractor (30) includes an ion beam passage slit (31) through which the ion beam (100) passes, the ion beam passage slit (31) is formed so that the shape is the same or substantially the same as that of the ion outlet (11), the ion outlet (11) and the ion beam passage slit (31) are disposed to face each other with a gap therebetween, the ion collector (40) is formed so that the shape is the same or substantially the same as that of the ion beam passage slit (31), and the ion beam passage slit (31) and the ion collector (40) are disposed to face each other with a gap therebetween so that their shapes match to each other.

Effects of the Invention

The grid of the invention has on its side surface the ion outlet that is formed to be elongated in the longitudinal direction and emit the ion beam therefrom, and the ion beam obtained from the ion source is formed in a belt shape. Accordingly, when a vacuum measurement device such as an electrostatic deflection ion extractor ionization vacuum gauge or a magnetic field deflecting mass spectrometer is manufactured by using the ion source, the energy dispersion of the ion becomes smaller compared to a conventional vacuum measurement device such as a mass spectrometer or an ionization vacuum gauge including an ion source with a grid having an opened bottom surface. For this reason, in the ion extractor electrostatic deflection ionization vacuum gauge, there is a merit in that a vacuum system adaptable to a cylindrical energy analyzer (sector-shaped deflector electrode) having an axis matching with the Z axis of the cylindrical grid may be designed, and a design of enhancing the ion passage probability may become possible.

Further, when the ion source of the invention is applied to the vacuum measurement device of the mass spectrometer using a magnetic field, it is possible to provide a vacuum measurement device such as an ionization vacuum gauge also serving as a leak detector or a magnetic field deflecting mass spectrometer capable of projecting an ion beam in a direction perpendicular to a magnetic field (where a beam is not expanded in the Z direction) of a magnetic line parallel to the Z axis of a cylindrical grid, easily designing an ion mass spectrometer, and improving the intensity of the same ion beam.

Furthermore, since the soft X-rays and the ESD ion are generated at the top and bottom surfaces of the cylindrical grid, and the direction is different by 90° from and at a right angle to the direction of the belt-shaped ion beam extracted in the lateral direction, it is possible to provide a vacuum measurement device also serving as both a mass spectrometer and an ionization vacuum gauge system capable of making both noises hardly enter the obtained belt-shaped ion beam, greatly improving the X-ray limitation, and mounted with an ion source having small ESD ion noise.

Further, since the vacuum measurement device of the invention serves as a mass spectrometer of an ionization vacuum gauge capable of measuring a gas ratio to obtain a ratio of a density of molecule (atom) of a specified gas, it is not necessary to attach an expensive mass spectrometer or an expensive leak detector to the vacuum device. Even when the extremely high vacuum pressure is measured by the ionization vacuum gauge, it is possible to measure the true pressure (hydrogen) in the state where the effectiveness degree of the soft X-ray or the error of CO as neutral ESD which cannot be removed in the conventional energy analyzer mounting type is given. Accordingly, it is possible to measure the pressure of 10−9 Pa or less with higher precision.

Further, by setting a specified gas to be detected to m/e=14 of nitron atom, and when leakage occurs in the vacuum device a nitrogen gas forming an atmosphere appears as represented by an increase of m/e=14 which is the specified gas, so that an atmosphere leak monitor may be realized which promptly detects the leakage from the ratio between the entire pressure and the specified gas.

Furthermore, when the leaking place of the vacuum device is inspected, a helium leak detector may be realized in a manner such that the potential of the grid or the intensity of the magnetic field is changed so that the specified gas matches the helium ion. Further, when the specified gas is set to a water molecule (m/e=18 or m/e=17), the vacuum measurement device may be utilized as a moisture meter capable of always monitoring a partial pressure of water inside the vacuum device.

Further, when the intensity of the magnetic field is further changed to a strong type and the potential of the grid is decreased, the vacuum measurement device may be utilized to monitor a specified gas molecule of m/e>100 or more.

Likewise, according to the invention, it is possible to provide the vacuum measurement device also serving as the multi-functional ionization vacuum gauge capable of analyzing a mass which could not have been achieved only by the conventional ionization vacuum gauge, and to provide a cost reduction measures for an industrial production field using a vacuum.

DETAILED DESCRIPTION OF PREFERRED EMBODIMENTS

Hereinafter, an embodiment of the invention will be specifically described with reference to the drawings.

Figure 1:
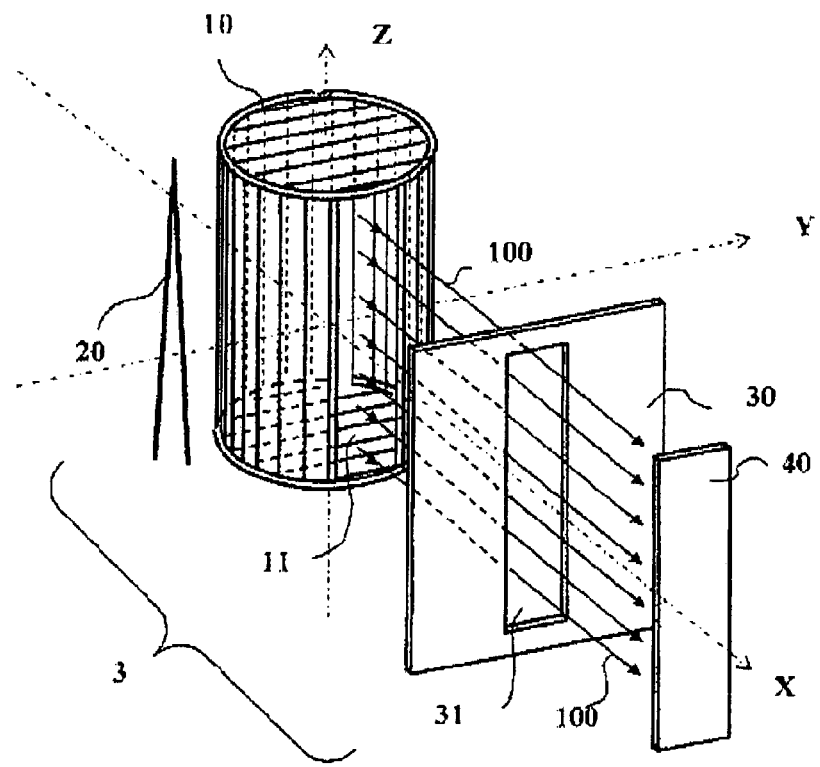
FIG. 1 is a diagram illustrating a gauge head of an ion extractor ionization vacuum gauge according to an embodiment of the invention.
Figure 2:
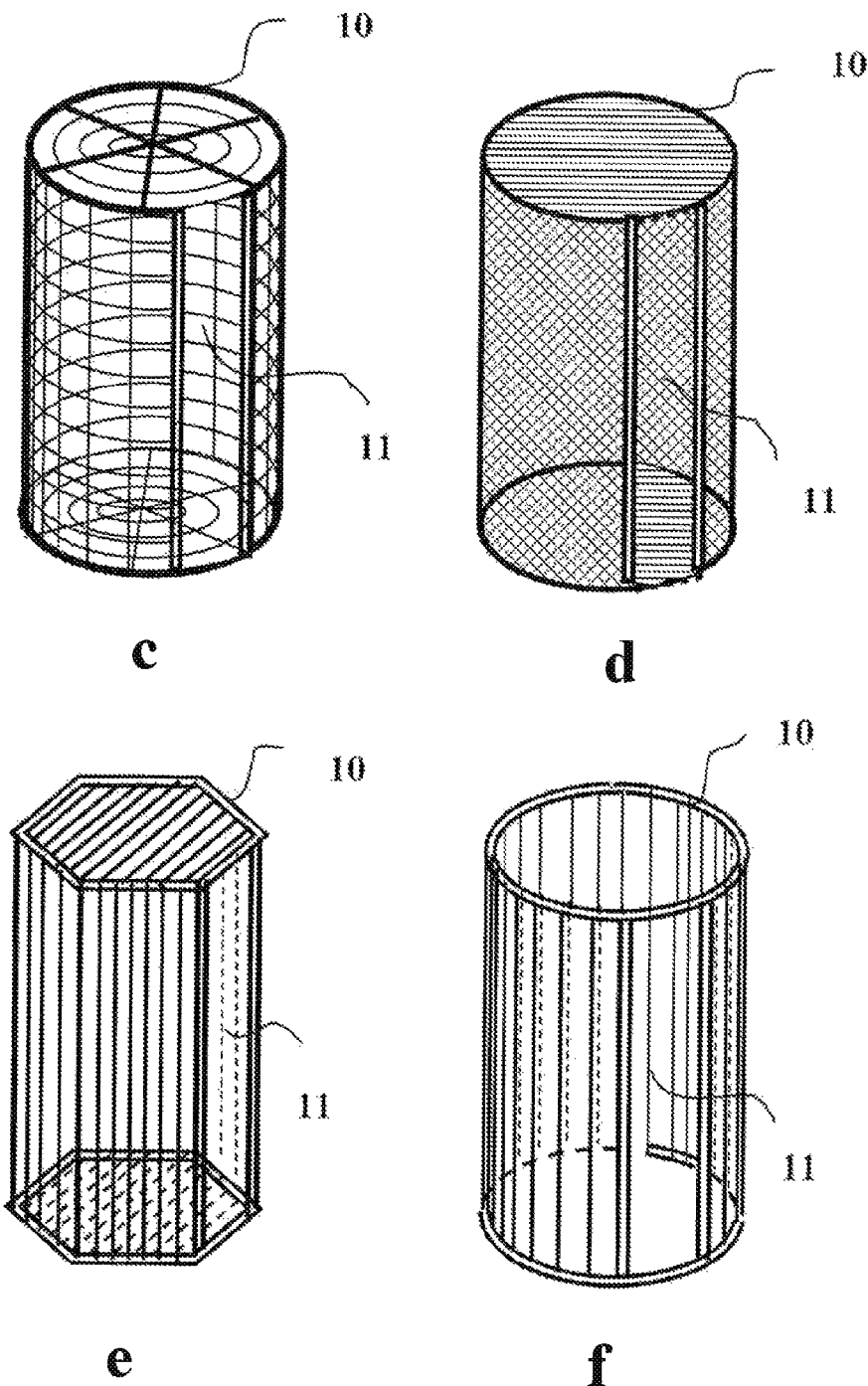
FIG. 2 illustrates four examples of a grid structure according to the embodiment of the invention.

A gauge head of the embodiment shown in FIG. 1 is a part of a vacuum measurement device, and is disposed inside a vacuum vessel. An ion source 3 includes a grid 10 and an electron source 20, and corresponds to an ionization vacuum gauge that vibrates electrons emitted from an electron source inside and outside the grid 10 to ionize gas molecules flying into the grid 10, extracts the ionized gas molecules as an ion beam 100 from an ion outlet 11, the ion beam is captured by an ion collector 40 to be converted into a current signal, and then measures a gas molecule density.

The grid 10 is a grid-shaped cylindrical body through which electrons pass, where the ion outlet 11 is opened to be elongated in the longitudinal direction along the side surface of the grid 10, and the length of the ion outlet 11 is set to be equal or substantially equal to the length of the side surface of the grid 10.

An ion extractor 30 includes an ion beam passage slit 31 through which the ion beam 100 passes, where the shape of the slit 31 is the same or substantially the same as that of the ion outlet 11, and the ion outlet 11 and the slit 31 face each other with a gap therebetween so that their shapes match each other.

Further, the shape of the ion collector 40 is the same or substantially the same as that of the slit 31, and the slit 31 and the ion collector 40 face each other with a gap therebetween so that their shapes match each other.

The grid 10 shown in FIG. 1 is obtained in a manner such that a platinum clad molybdenum wire of about $\phi$ 0.2 mm is cut to have a length of about 30 mm, and 18 cut wires are arranged and welded at the same interval of 3 mm on the circumference of a ring with a diameter of 20 mm and formed of the same wire of a diameter of 0.5 mm. The longitudinal length of the ion outlet 11 is set to be about 30 mm, and the width thereof is set to be about 9 mm. Further, the same wire may be welded to the circumference of the top and bottom surfaces of the grid 10.

The basic technical idea of the invention is to have the ion outlet 11 opened to be elongated in the longitudinal direction along the side surface of the grid 10, so that the shape of the grid may be arbitrarily formed such that the cross-section of the cylinder has a circular shape or any polygonal of more than a pentagon shape, so long as the opening is provided along the side surface as shown in FIGS. 2*c* to 2*f*. When the length of the cylinder is made to be long compared to the thickness of the cylinder, the cylinder may have a shape shown in FIG. 2*f* in which the top and bottom surfaces are not blocked.

Figure 3:
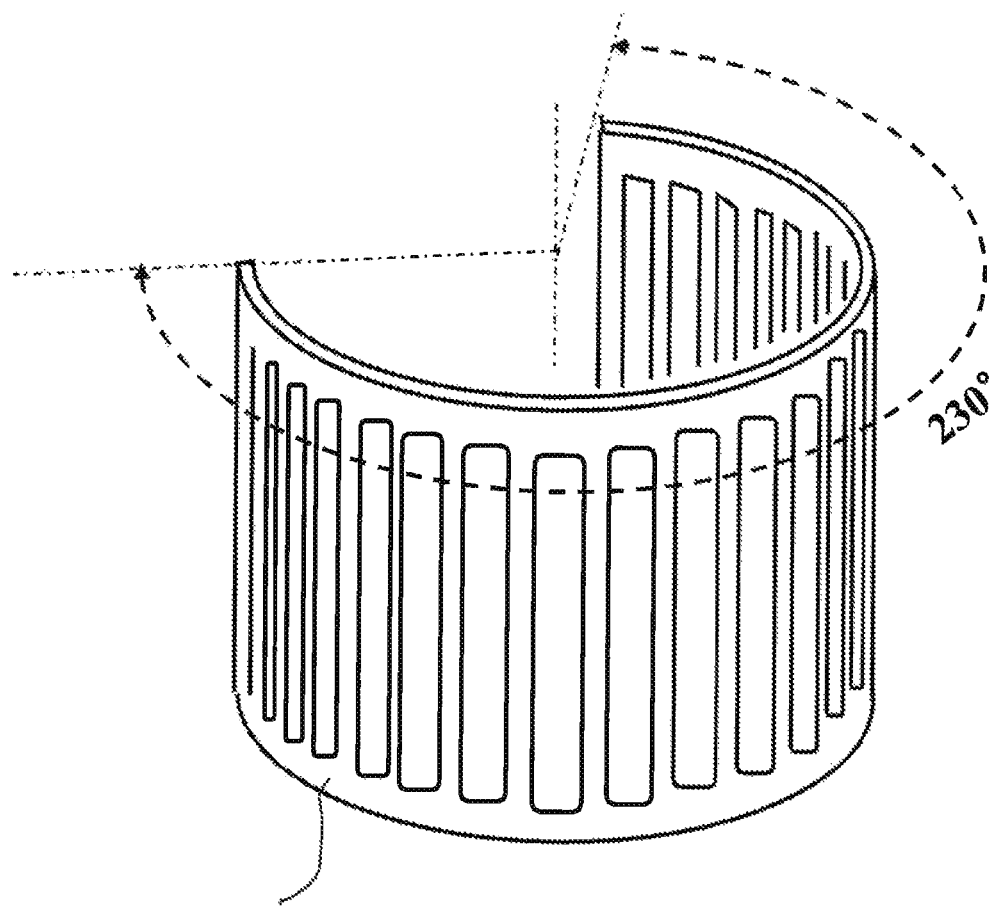
FIG. 3 illustrates one embodiment of a cylindrical sector-shaped deflector with a deflecting angle of 230° when electrostatically deflecting an ion beam obtained from an ion source according to the embodiment of the invention.

FIG. 3 illustrates one embodiment of an ion beam deflector electrode 38 that electrostatically leads the belt-shaped ion beam 100 from the ion extractor 30 to the ion collector 40.

Figure 4:
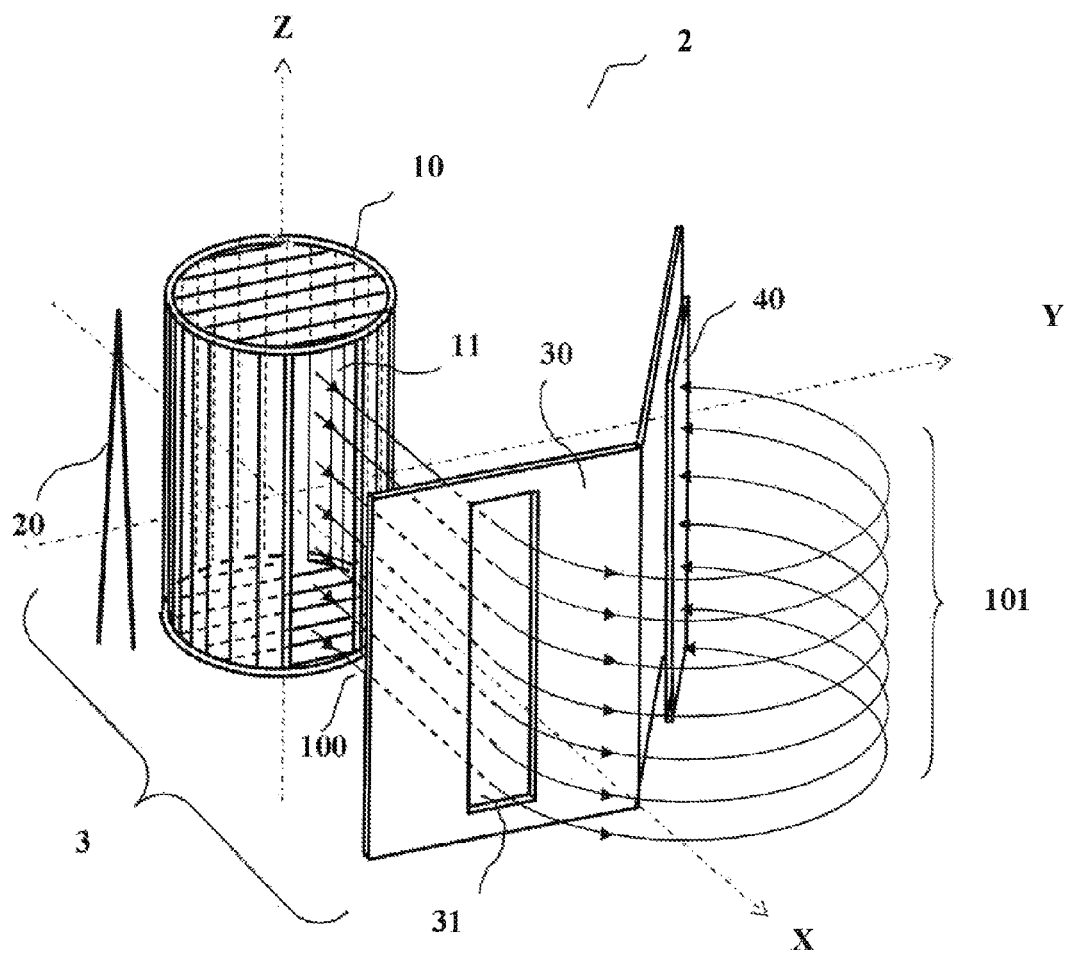
FIG. 4 is a diagram illustrating a principle of a gauge head three-dimensionally showing an orbit of a belt-shaped ion beam when configuring an ion extractor large angle deflection ionization vacuum gauge by a combination of the electrode of FIG. 3 and the invention of FIG. 1 according to the embodiment of the invention.

The ion beam deflector 38 shown in FIG. 3 is a sector-shaped cylindrical member of which both circumferential ends are provided within an angular range from 180° to 270° (230° in the example shown in the drawing) when seen from the central axis thereof, and is disposed so that its axis is parallel to the axis of the grid 10. Further, the ion beam deflector electrode 38 is a deflector electrode with a single electrode formed in a grid shape. The length of the ion beam deflector electrode 38 is equal or substantially equal to that of the grid 10, and the side surface thereof is provided with a plurality of elongated rectangular windows. In FIG. 4, numeral 101 indicates an orbit of the ion beam when it is deflected by the ion beam deflector electrode 38.

The characteristic feature of the embodiment is such that the ion beam deflector electrode 38 reflects and deflects the ion beam 100 with the positive potential, the deflector does not need to be formed to have two electrodes like a coaxial double cylindrical energy analyzer having a positive outer cylinder and a negative inner cylinder, thereby providing a small and simple vacuum measurement device in which the axis of the grid 10 and the axis of the deflector electrode 38 are parallel to each other and which suppresses the ion beam 101 from being expanded in the Z direction.

Figure 5:
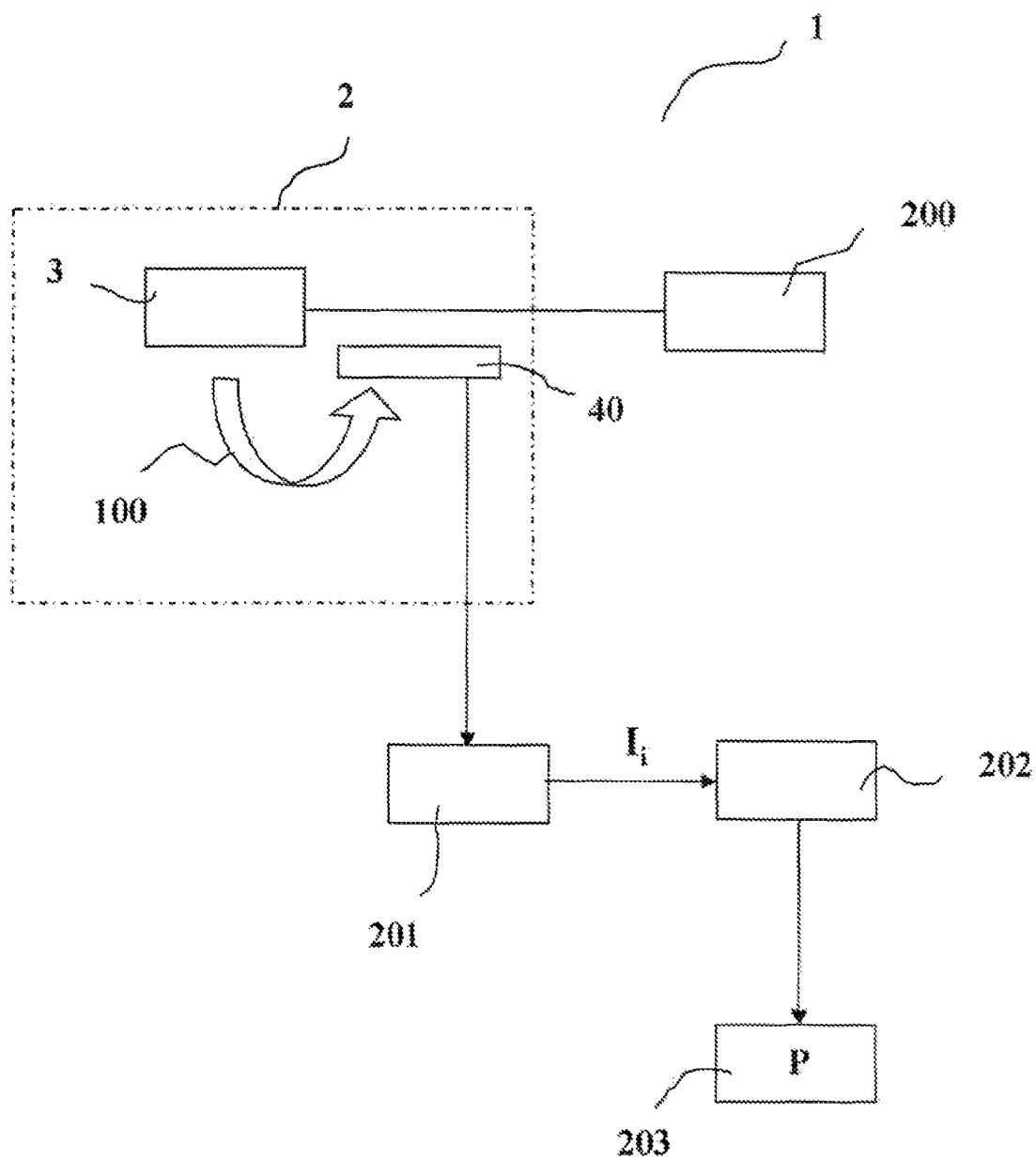
FIG. 5 illustrates a vacuum measurement device including an electronic circuit as an ionization vacuum gauge configured by using the gauge head of FIG. 4 according to the embodiment of the invention.

FIG. 5 illustrates an ionization vacuum gauge 1 including an electronic circuit for controlling a gauge head 2 obtained by combining FIGS. 3 and 4. The ion source 3 applies a potential to the grid 10 and a filament 20 from a control power supply 200, so that a constant amount of electrons flows. The ion beam flowing to a collector 40 is measured as a current Ii by an ammeter 201, is converted into a pressure P by an arithmetic circuit 202, and then is displayed on a display 203.

Figure 6:
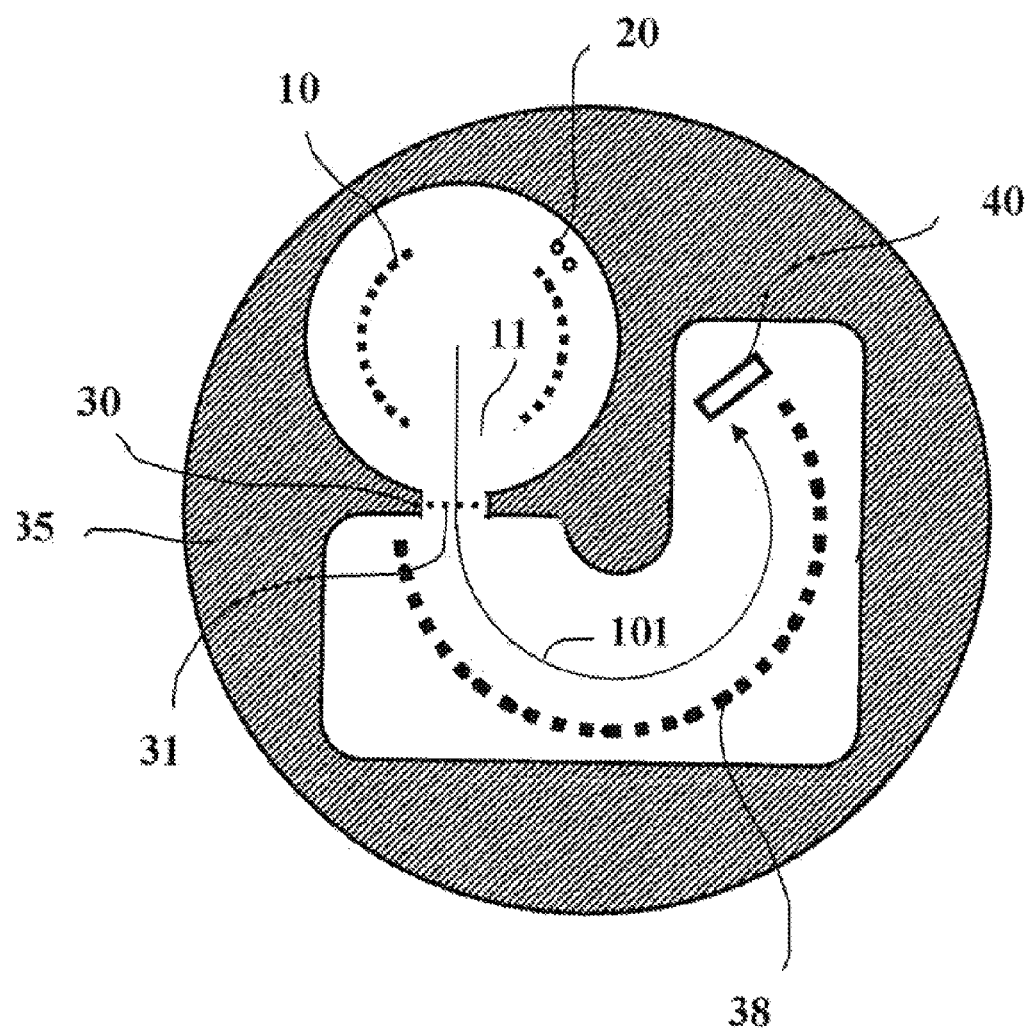
FIG. 6 is a cross-sectional view of a gauge head of an ion extractor large angle deflection ionization vacuum gauge used for test inspection and configured by a combination of FIGS. 3 and 4 according to the embodiment of the invention.

FIG. 6 is a cross-sectional view of the gauge head used for inspection in the embodiment thereof. A metallic bulk 35 is provided, and the bulk 35 includes an ionization space provided with the grid 10 and the electron source 20 and a space provided with the ion collector, where the spaces communicate with each other through the ion beam passage slit 31. Specifically, an ion source obtained by combining a hairpin-shaped filament as the electron source 20 and the grid 10 having the ion outlet 11 formed at the side surface thereof, is disposed in a space formed by cutting the bulk 35, and a slit formed in the bulk 35 to be elongated in the longitudinal direction is used as the ion beam passage slit of the ion extractor electrode 30. The belt-shaped ion beam generated from the ion source passes through the ion beam passage slit 31 and is deflected by the ion beam deflector electrode 38 up to 230° in the circular orbit. Accordingly, when the ion collector 40 is disposed at a position rotated by 230°, a vacuum measurement device may be provided as a large angle deflection ion extracted ionization vacuum gauge.

Figure 7:
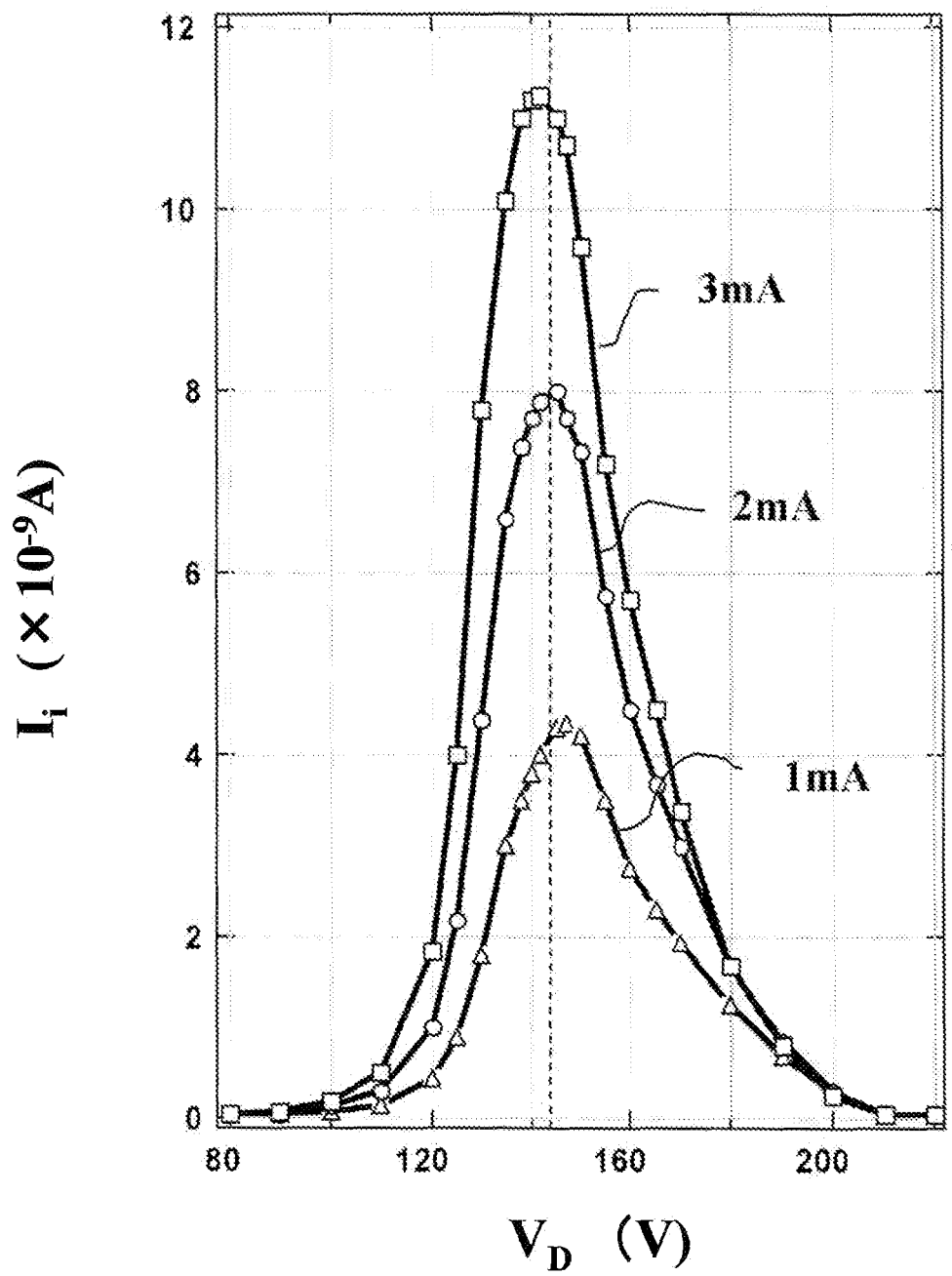
FIG. 7 illustrates a change of an ion current of an ion collector with respect to a potential of a deflector in the gauge head shown in FIG. 6 according to the embodiment of the invention.

FIG. 7 illustrates the vacuum measurement device of the ionization vacuum gauge with the configuration of FIGS. 5 and 6 wherein the ion current Ii is changed when the voltage Vd of the sector-shaped deflector electrode 38 is changed when the potential of the filament is set to 100 V and the potential of the grid is set to 220 V. In the ion source from which the belt-shaped ion beam using the grid 10 of the embodiment is obtained, since ESD ions hardly enters, no peak is found due to ESD ions in the result of FIG. 7. The maximum value of the gas-phase peak is Vd=144V, and when the electron current is changed in the range of Ii=1 to 3 mA, the positional deviation thereof is slight. This result shows that the electric field is slightly deformed due to the space charge of the electron, and since the dispersion of the ion energy is small, the large angle deflection ion extractor ionization vacuum gauge of the embodiment may be operated as a stable vacuum gauge.

Further, when a high voltage of +350 V is applied to the sector-shaped deflector electrode 38, the ion beam 101 will be in a cut-off state where it cannot reach the ion collector 40, and the residual current becomes Ii=1×10$^{-15}$ A. For this reason, it could have been estimated that the limitation of the X rays of the vacuum gauge is <1×10$^{-11}$ Pa by using the equation of Ii=SPIe. Here, S indicates a proportional constant referred to as a sensitivity coefficient, and the value obtained by the test was S=3.7×10$^{-2}$ Pa$^{-1}$. With the ion extractor ionization vacuum gauge (extractor vacuum gauge) currently available in the market, the X-rays limitation value is about $\frac{1}{50}$ or less. Therefore, the present invention has become able to provide the ionization vacuum gauge capable of measuring the extremely high vacuum of 1×10$^{-11}$ Pa.

Figure 8:
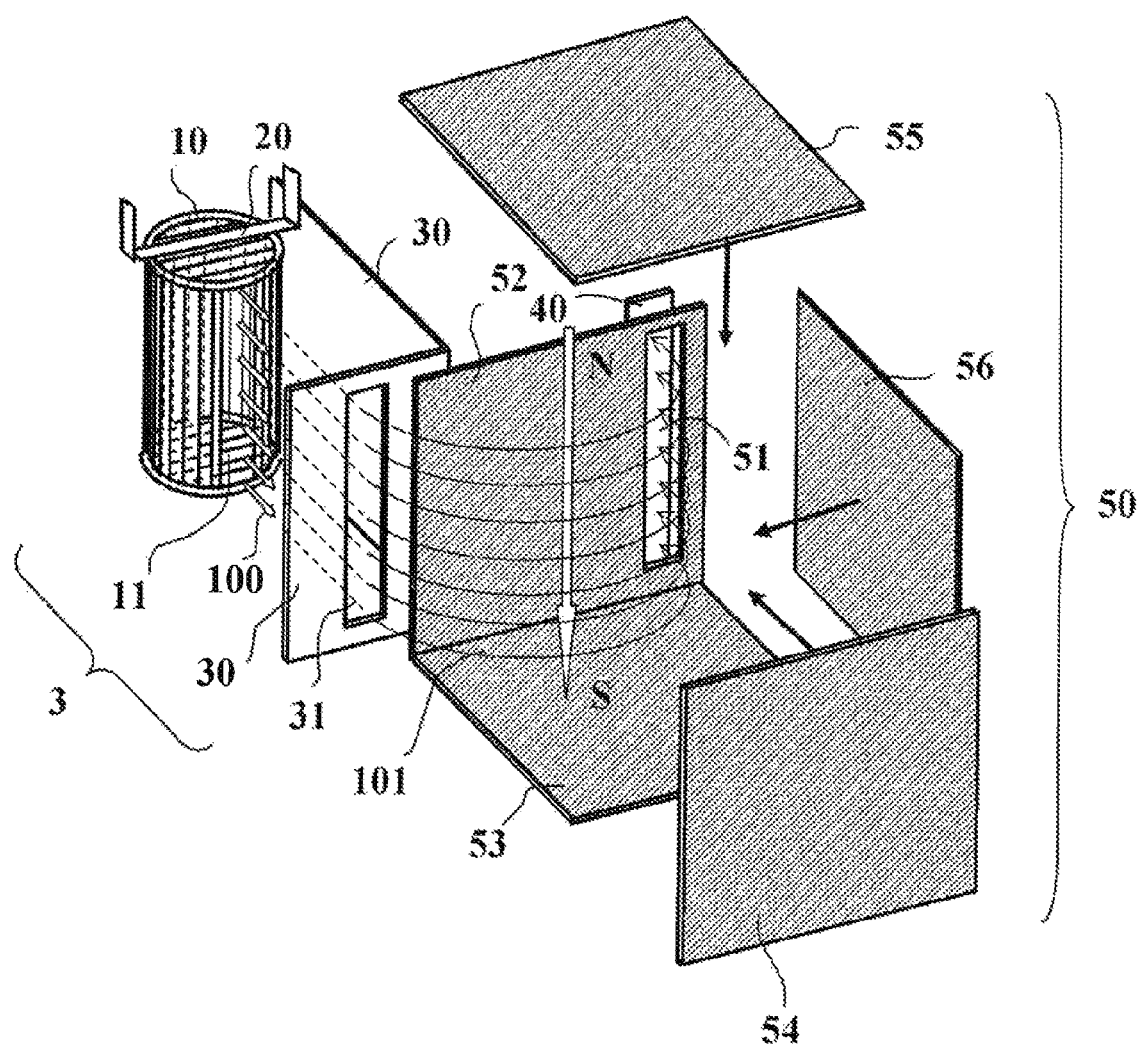
FIG. 8 is a perspective view illustrating a gauge head used in a vacuum measurement device capable of measuring a ratio of a specified gas according to the embodiment of the invention.

Next, FIG. 8 is a three-dimensional schematic diagram illustrating one embodiment of the gauge head when the ion source of the invention is applied to a vacuum measurement device such as a leak detector or a magnetic field deflecting mass spectrometer.

The gauge head of FIG. 8 is a magnetic field deflecting mass spectrometer, and is also an ionization vacuum gauge that can be used as a leak detector and detect an entire pressure with high precision. The belt-shaped ion beam 100 obtained from the ion source 3 is led to a magnetic field space (NS) in the direction perpendicular to the traveling direction of the ion beam, and ions are separated in accordance with a ratio m/e between a mass and a charge using Lorentz's force generated when ions travel in the magnetic field space. As the ion collector, there are provided a primary ion collector 40 (specified ion dedicated collector) disposed at a position where the specific ions among the separated ions converge, and a secondary ion collector 50 (accumulating ion collector) capturing ions other than the specified ions. Then, the density (pressure) of gas molecules of a vacuum gauge (ion source 3) is obtained from the total current obtained by adding the current of the primary ion collector 40 and the current of the secondary ion collector 50 to each other, and the ratio of the density (pressure) of the gas molecules of the specified ions with respect to the density (pressure) of the gas molecules is obtained from the ratio of the current of the primary ion collector 40 included in the total current.

Figure 9:
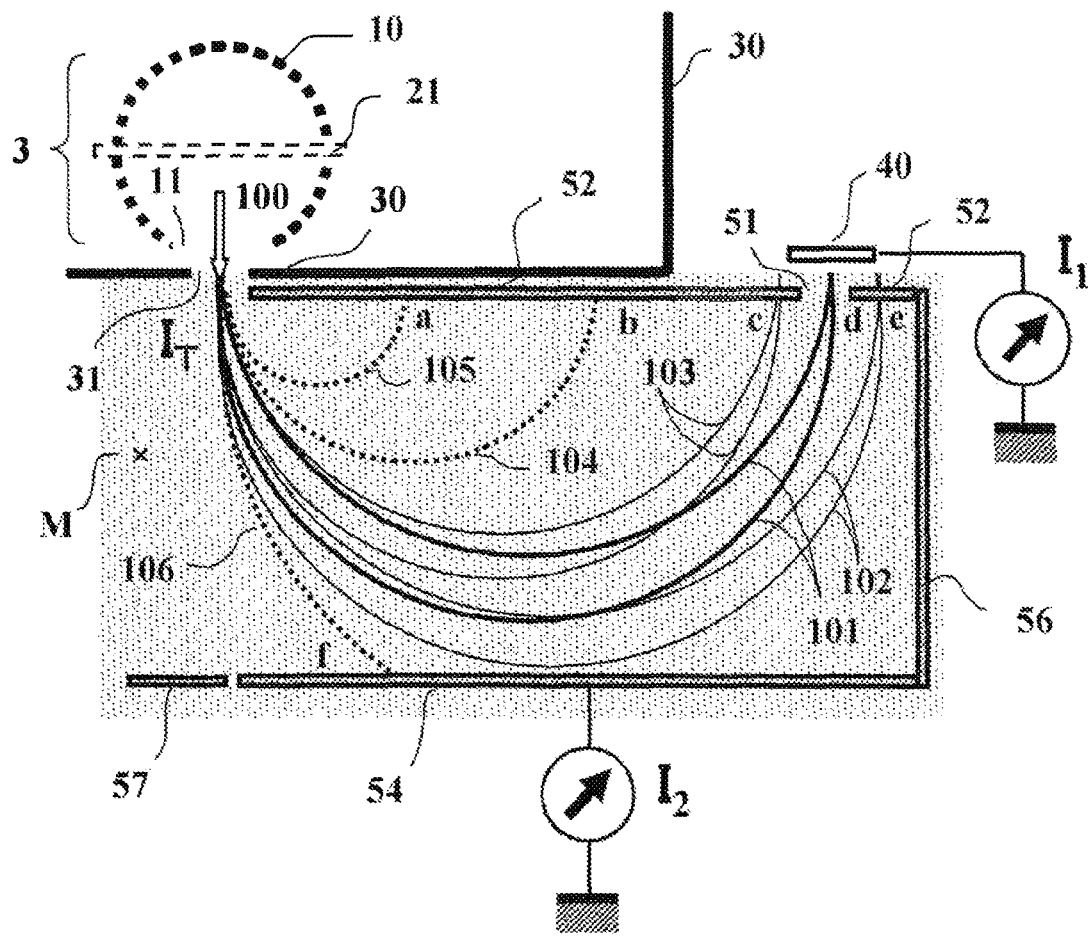
FIG. 9 is a cross-sectional view illustrating a principle of FIG. 8 according to the embodiment of the invention.
Figure 10:
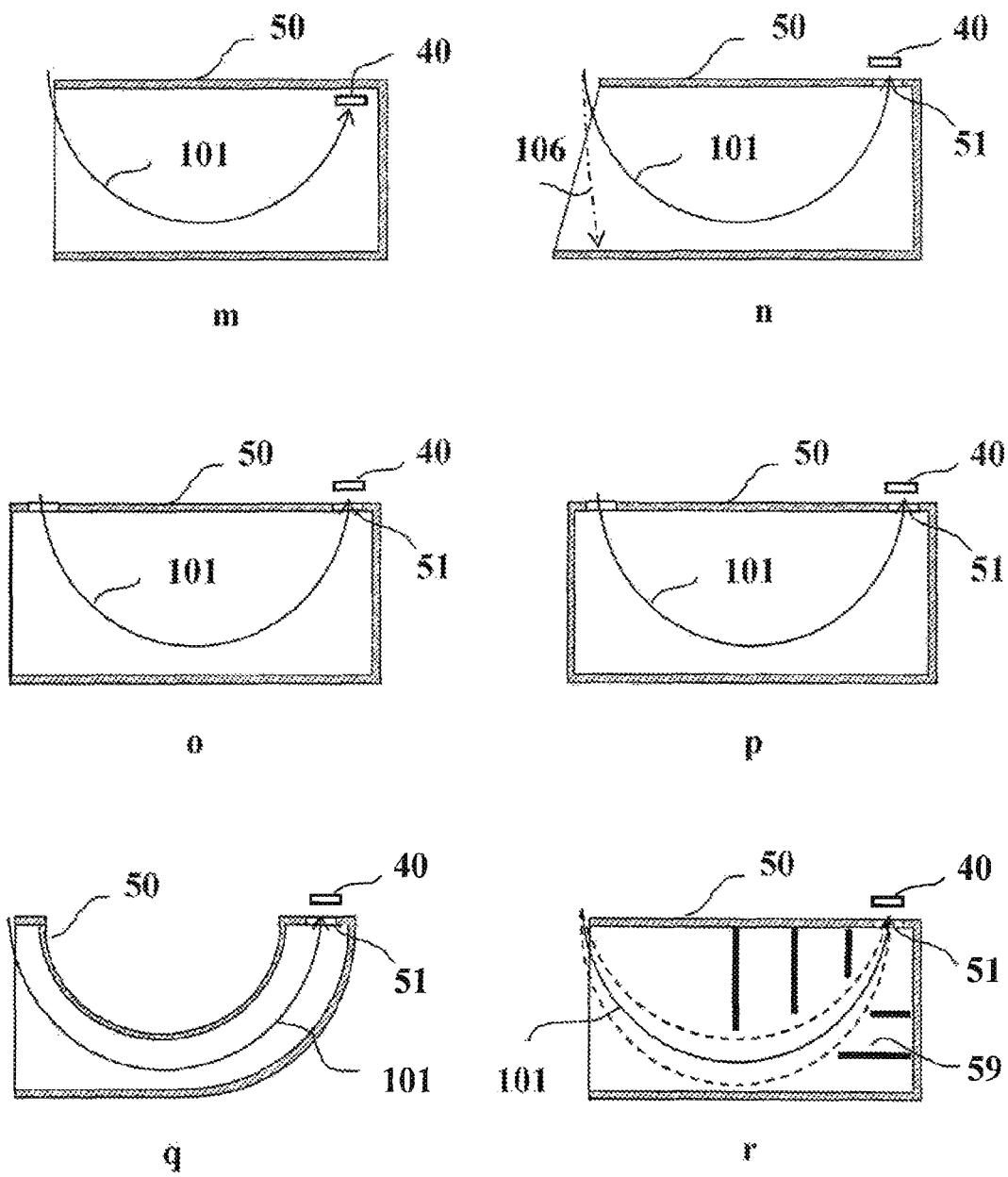
FIG. 10 is a development example of a secondary ion collector according to the embodiment of the invention.

FIG. 9 illustrates the cross-section of the gauge head of FIG. 8. In the case of this embodiment, the filament 20 emitting electrons is formed in a ribbon shape, and is disposed at the center of the top and bottom mesh surfaces of the grid 10.

When several mA of electrons are emitted from the filament toward the grid in this state, the electrons pass through the grid of the top and bottom mesh surfaces and flow into the grid. Accordingly, the electrons can efficiently move up and down while moving in a spiral shape around the center of the cylindrical grid 10, so that gas ions can be generated on the central axis of the grid.

The ion extractor electrode 30 is disposed at the side surface of the grid 10, and the ion beam 100 is emitted from the ion outlet 11 of the grid 10 and passes through the slit 31 on the ion extractor electrode 30.

The belt-shaped ion beam 100 passing through the slit 31 of the ion extractor electrode 30 enters the magnetic field space M (the sand soil pattern of FIG. 9), and is converged at the point d rotated by 180° depicting a circular orbit 101 due to Lorentz's force. At the converging position, there is disposed the primary ion collector 40 that is formed in a plate shape to capture the belt-shaped ion beam. Here, it is important to note that the ions not reaching the primary ion collector 40 among the belt-shaped ion beam exit the slit 31 all collide with the secondary ion collector 50 (depicted by the slanted lines) of FIG. 8. In FIG. 8, in order to easily understand the relation between the structure of the secondary ion collector 50 and the ion beam, three plates, that is, plates 54, 55, and 56 are separated from five plates constituting the collector.

In the secondary ion collector 50, the surface capturing ions other than the specified ions is three-dimensionally provided to surround the orbit depicted by the ion beam of the specified ions. Specifically, the secondary ion collector is formed in a hollow box shape without one surface using five plates.

When the ion collector 40 is disposed at a position directly before the plate 52 of the secondary ion collector 50 formed to be elongated in the longitudinal direction and substantially proportional to the slit 31, the slit 51 may not be provided.

The basic principle of this embodiment will be described by referring to FIG. 9.

In order to allow the specified ions in the belt-shaped ion beam 100 generated from the ion source 3 to be incident upon the primary ion collector 40 through the orbit 101, the atomic mass m of the specified ions, the grid potential E (voltage), the magnetic field intensity M (Gauss), and the turning radius R (centimeter) of the beam orbit are determined to match the following equation (1).

$$R = 144\sqrt{E}\sqrt{m} \div M \qquad \text{Equation (1)}$$

Even when the beam of the specified ions is expanded a little when exiting the slit 31, the beam converges at the point d depicting the orbit 101 of the turning radius R, and, hence, the beam incidents upon the primary ion collector 40 disposed at the position, so that only the current of the specified ions flows to the primary ion collector 40.

The ions having large energy among the specified ion beam pass through the orbit 102, are deflected by 180° to converge at the point e, and are captured by the plate 52 of the secondary ion collector 50. The ions having small energy among the specified ion beam pass through the orbit 103, are deflected by 180° to converge at the point c, and are captured by the plate 52 of the secondary ion collector 50 in the same manner.

The ion having a mass smaller than that of the specified ion converge at the point b depicting the orbit 104 of the turning radius R according to the equation (1), and is captured by the plate 52 of the secondary ion collector 50 in the same manner. The ion having a further smaller mass converge at the point a depicting the orbit 105, and is captured by the plate 52 of the secondary ion collector 50 in the same manner.

Further, the ion beam of the ion having a mass larger than that of the specified ion is captured by the plate 54 of the secondary ion collector 50 in the state of being diffused at the point f.

In the case where the mass is further larger and the radius R of the ion beam is near a straight-line, the length of the plate 54 of the secondary ion collector 50 is extended up to the position of the plate 57 of FIG. 9, thereby this ion is also made to collide with the secondary ion collector 50. That is, as shown in FIG. 9, in the belt-shaped ion beam exiting the slit 31, the ions other than the ions reaching the primary ion collector 40 are all captured by the secondary ion collector 50 and be converted into a current regardless of whether there is a difference in energy of the ion beam, and regardless of whether the ion has a mass other than the mass of the specified ion. The secondary ion collector may be formed in any shape as shown in FIGS. 10*m*, 10*n*, 10*o*, 10*p*, and 10*q* other than the box shape with five surfaces shown in FIGS. 8 and 9, so long as it has the above-mentioned structure.

Figure 11:
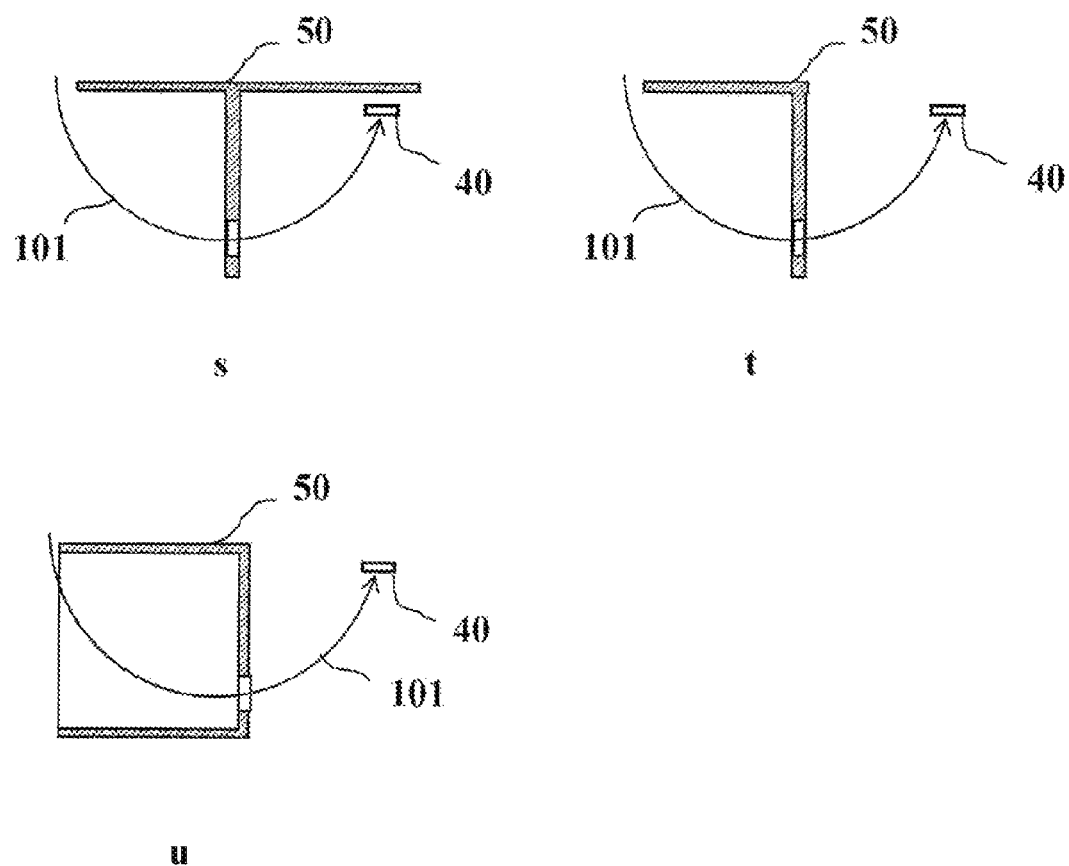
FIG. 11 is a development example configured by bending a plate material of the secondary ion collector according to the embodiment of the invention.

Further, as shown in FIG. 11, the secondary ion collector may be three-dimensionally formed to capture ions with a shape such as a T-shape as the capital T of the alphabet shown in FIG. 11*s*, an L-shape formed by bending as shown in FIG. 11*t*, or a shape shown in FIG. 11*u*.

As described above, the ion beam is led to the magnetic field space in the direction perpendicular to the traveling direction of the ion beam 100 shown in FIGS. 8 and 9, the primary ion collector 40 is disposed at a position where only the ion corresponding to the mass of the specified gas by Lorentz's force generated converges, when traveling the magnetic field, and further the secondary ion collector 50 is also disposed, which has a size and a shape capable of capturing the ion other than the specified ion dispersed and collected by the magnetic field, the dispersed and converged ion is captured, the current I1 of the primary ion collector 40 and the current I2 of the secondary ion collector 50 are obtained and added to each other, and as a result of this, the total current is completely equal to the ion current IT=I1+I2 of the ion beam 100, thereby providing a vacuum measurement device of an ionization vacuum gauge capable of measuring an entire pressure with high precision.

The current I1 obtained from the primary ion collector 40 with respect to the total current IT=I1+I2 indicates the ratio of the specified ion with respect to the entire pressure.

Figure 12:
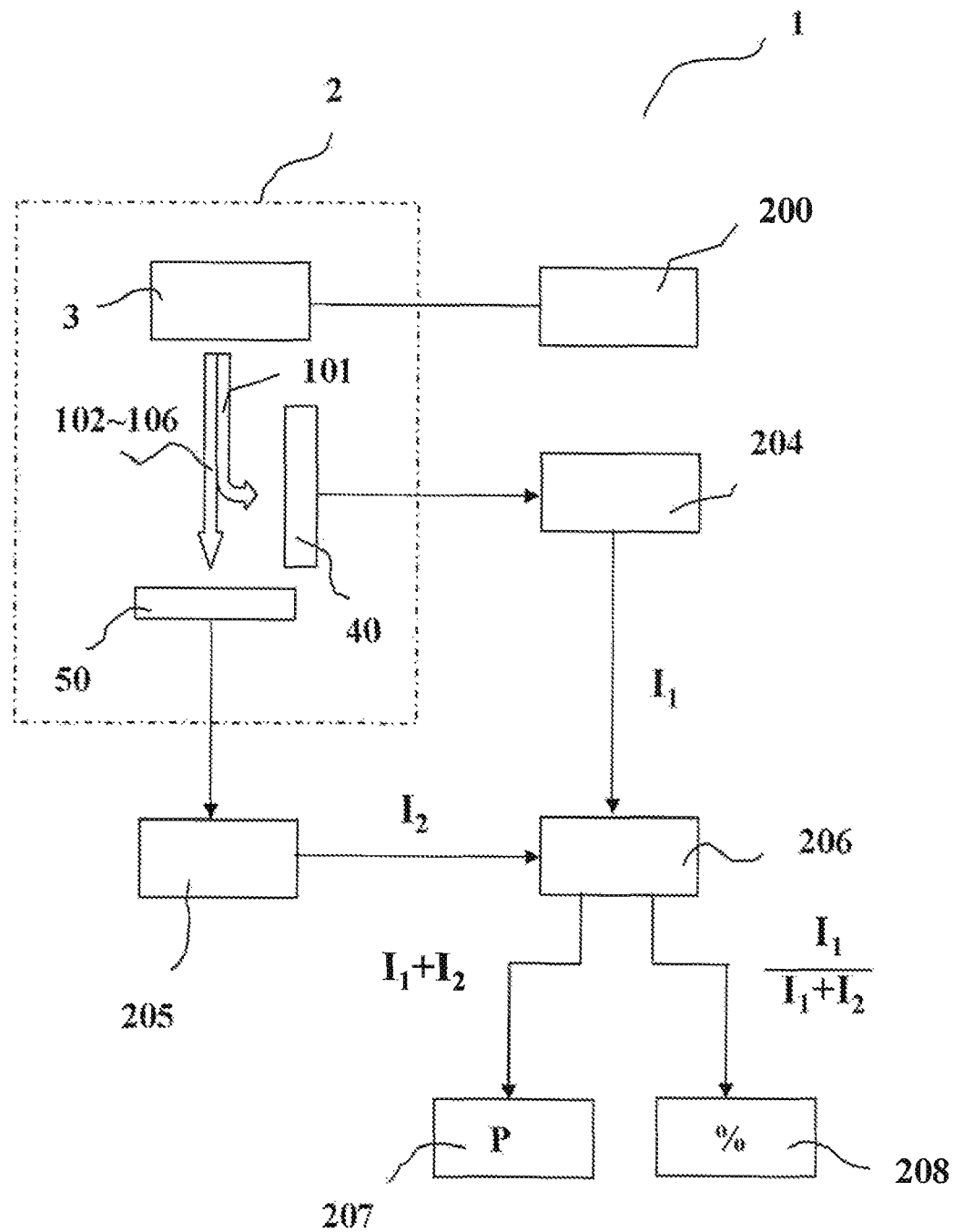
FIG. 12 is an overall diagram of a vacuum measurement device including an electronic circuit controlling the gauge head of FIG. 9 according to the embodiment of the invention.
Figure 13:
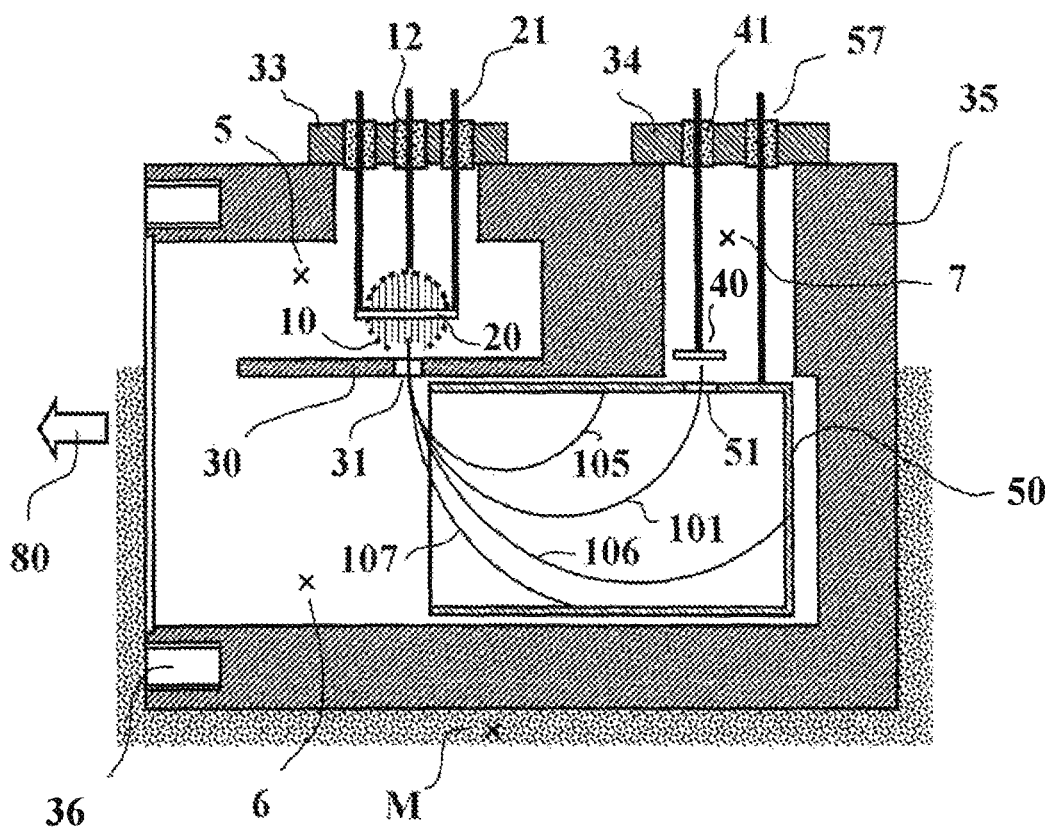
FIG. 13 is a cross-sectional view of a magnetic field changing gauge head used for inspection according to the embodiment of the invention.
Figure 14:
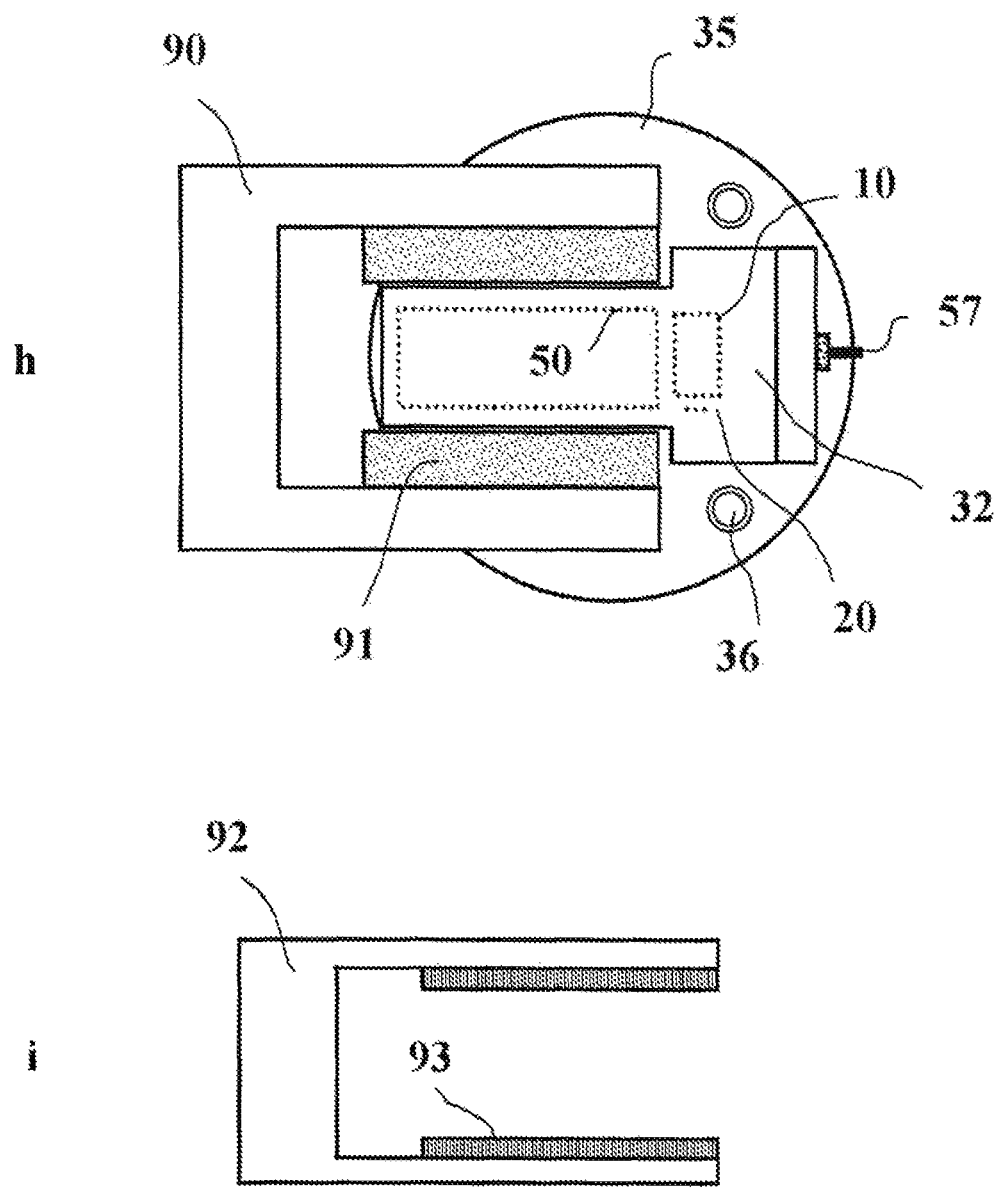
FIG. 14h is a diagram explaining an attachment state of a rectangular U-shaped yoke mounted magnet of a gauge head used for inspecting an actual condition according to the embodiment of the invention.
FIG. 14i is a diagram explaining a replaceable rectangular U-shaped yoke mounted weak magnetic field magnet according to the embodiment of the invention.
Figure 15:
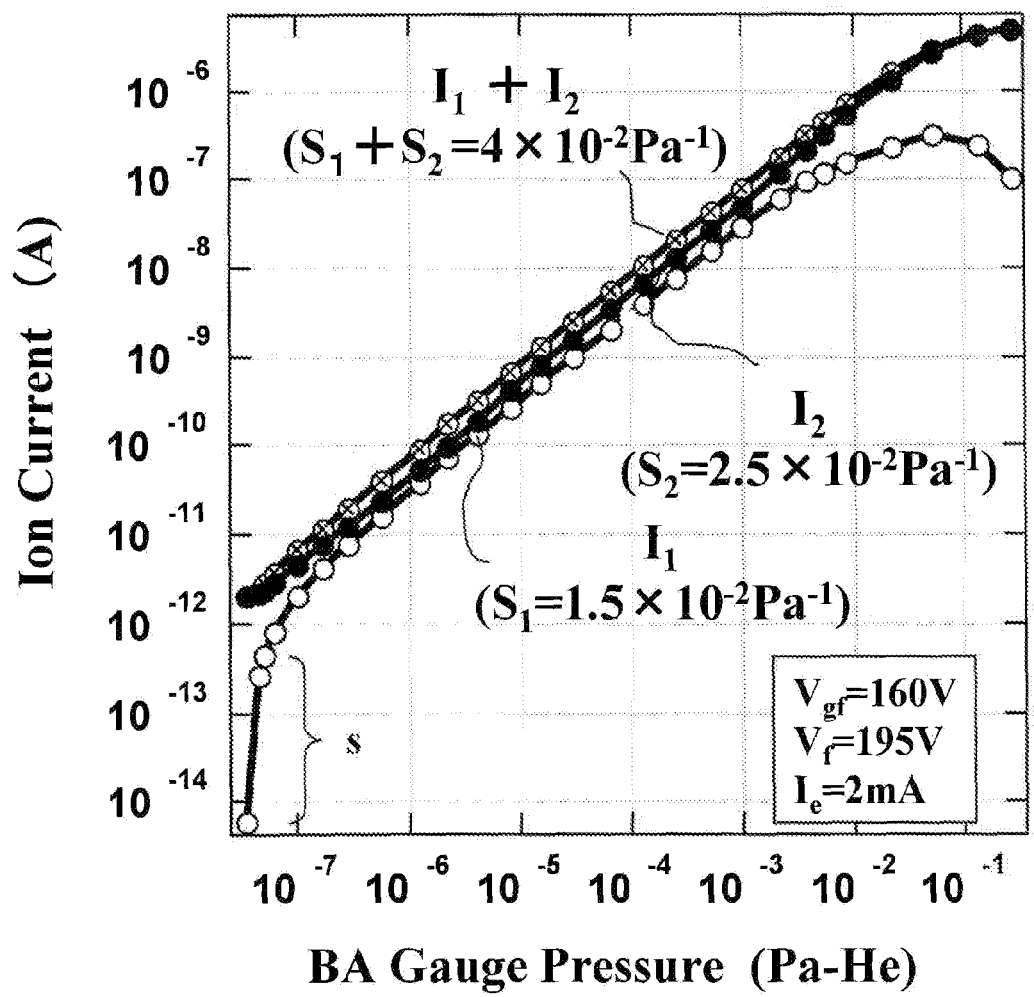
FIG. 15 illustrates ion current characteristics with respect to a helium pressure of a primary ion collector and a secondary ion collector of a gauge head used to inspect an actual condition.
Figure 16:
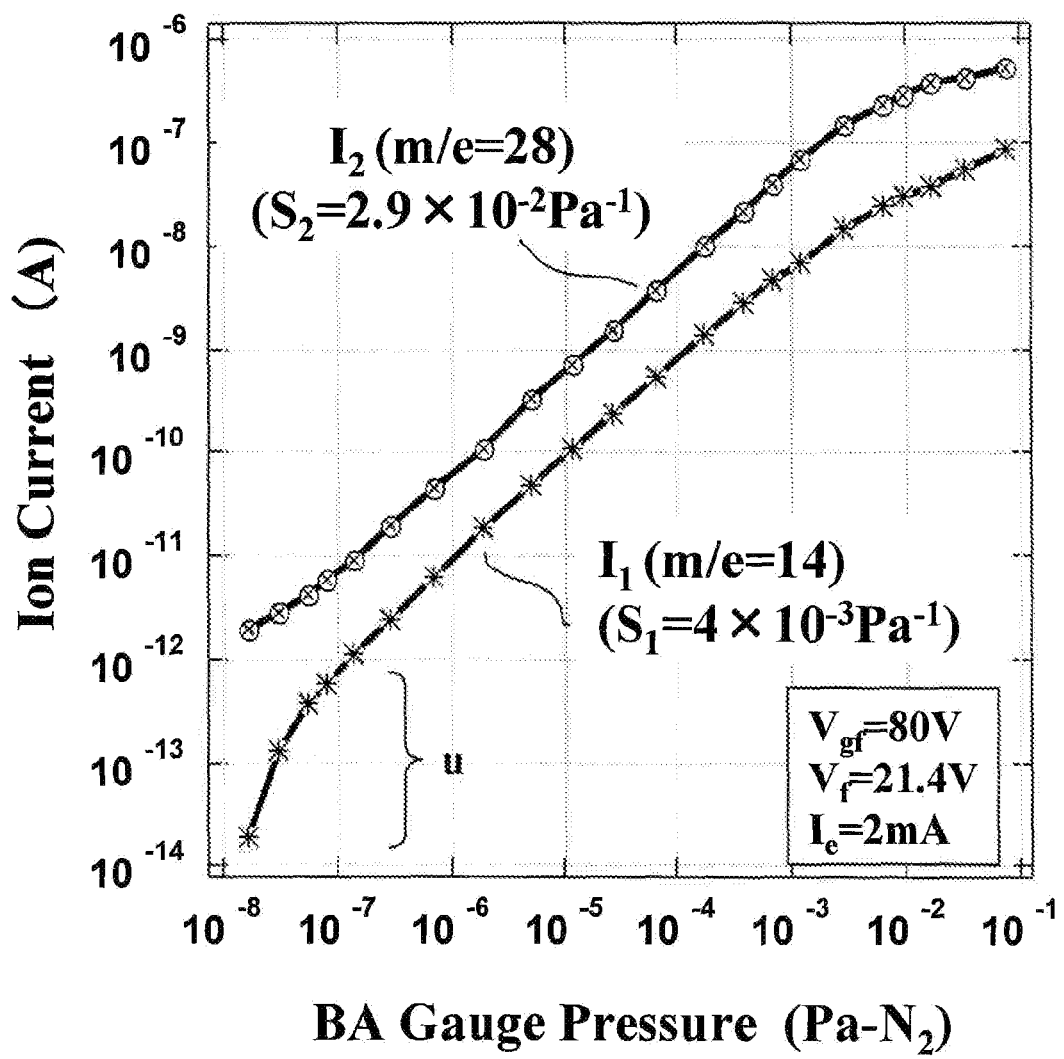
FIG. 16 illustrates ion current characteristics of the primary and secondary collectors with respect to a nitrogen pressure when the primary ion collector of the gauge head used to inspect an actual condition matches a nitrogen atomic ion.
Figure 17:
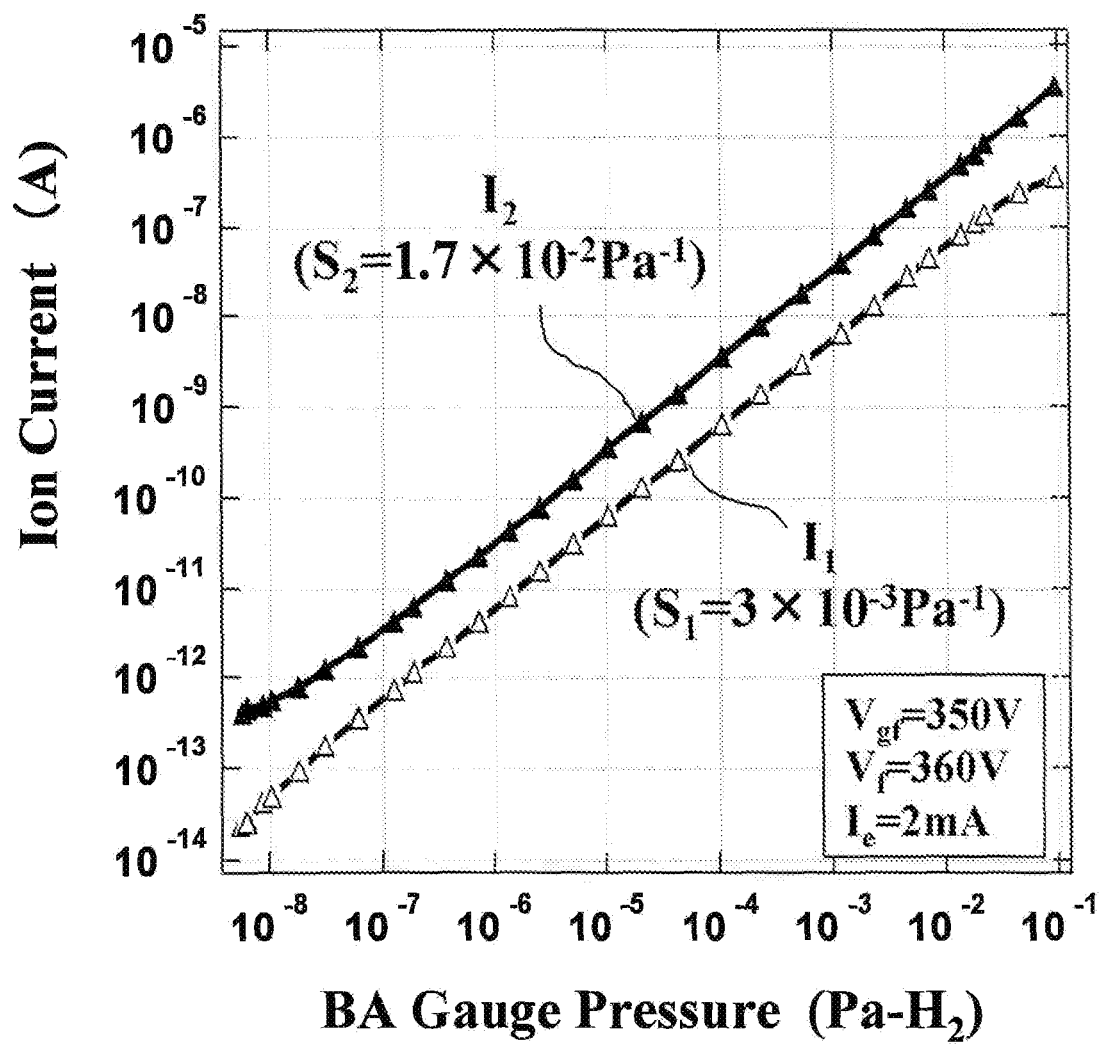
FIG. 17 illustrates ion current characteristics of the primary and secondary collectors with respect to a hydrogen molecular pressure when the primary ion collector of the gauge head used to inspect an actual condition matches a hydrogen molecular ion.
Figure 18:
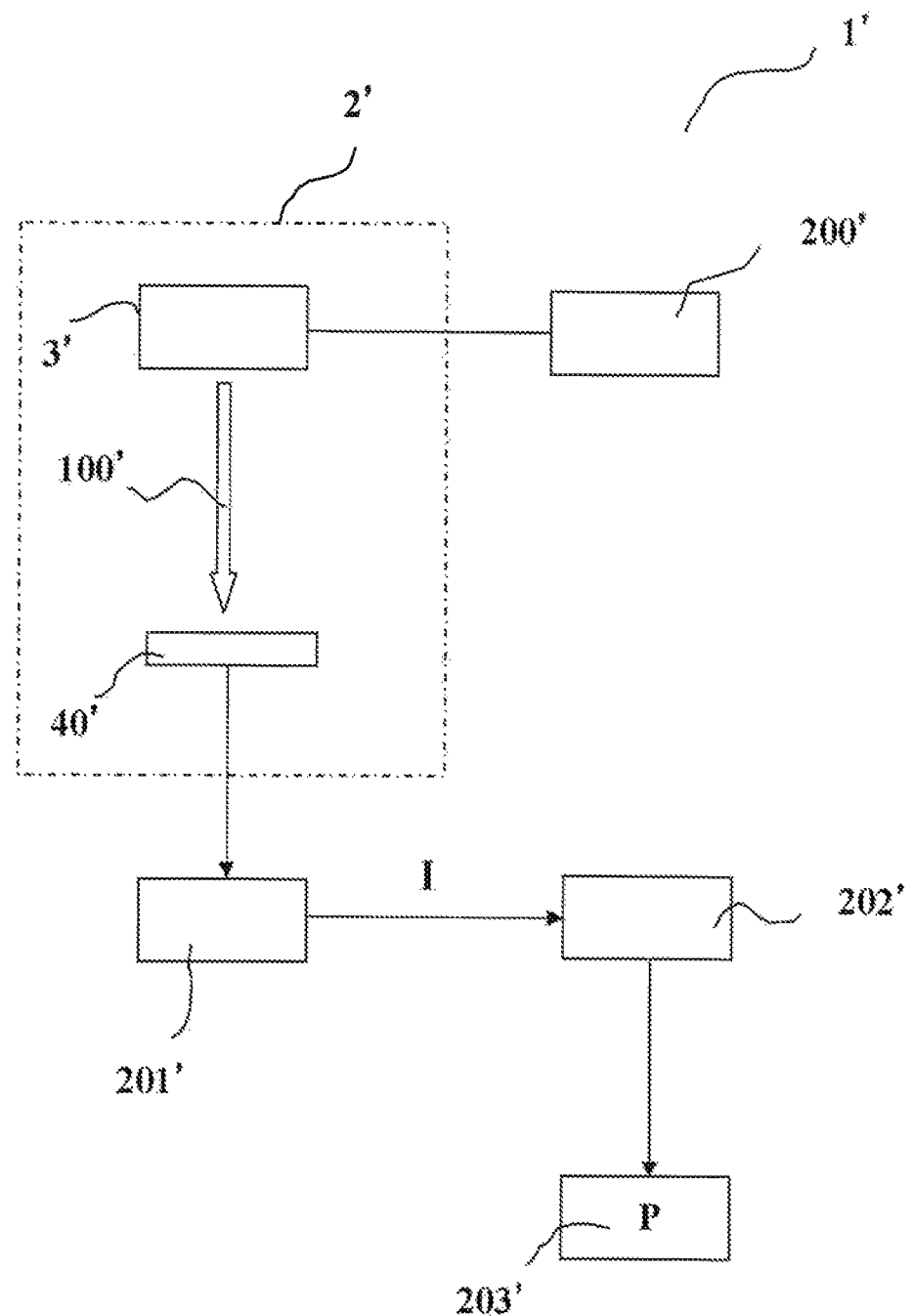
FIG. 18 illustrates a related art, and is an overall diagram of a vacuum measurement device as an ion extractor ionization vacuum gauge including an electronic circuit controlling a gauge head of FIG. 19.
Figure 19:
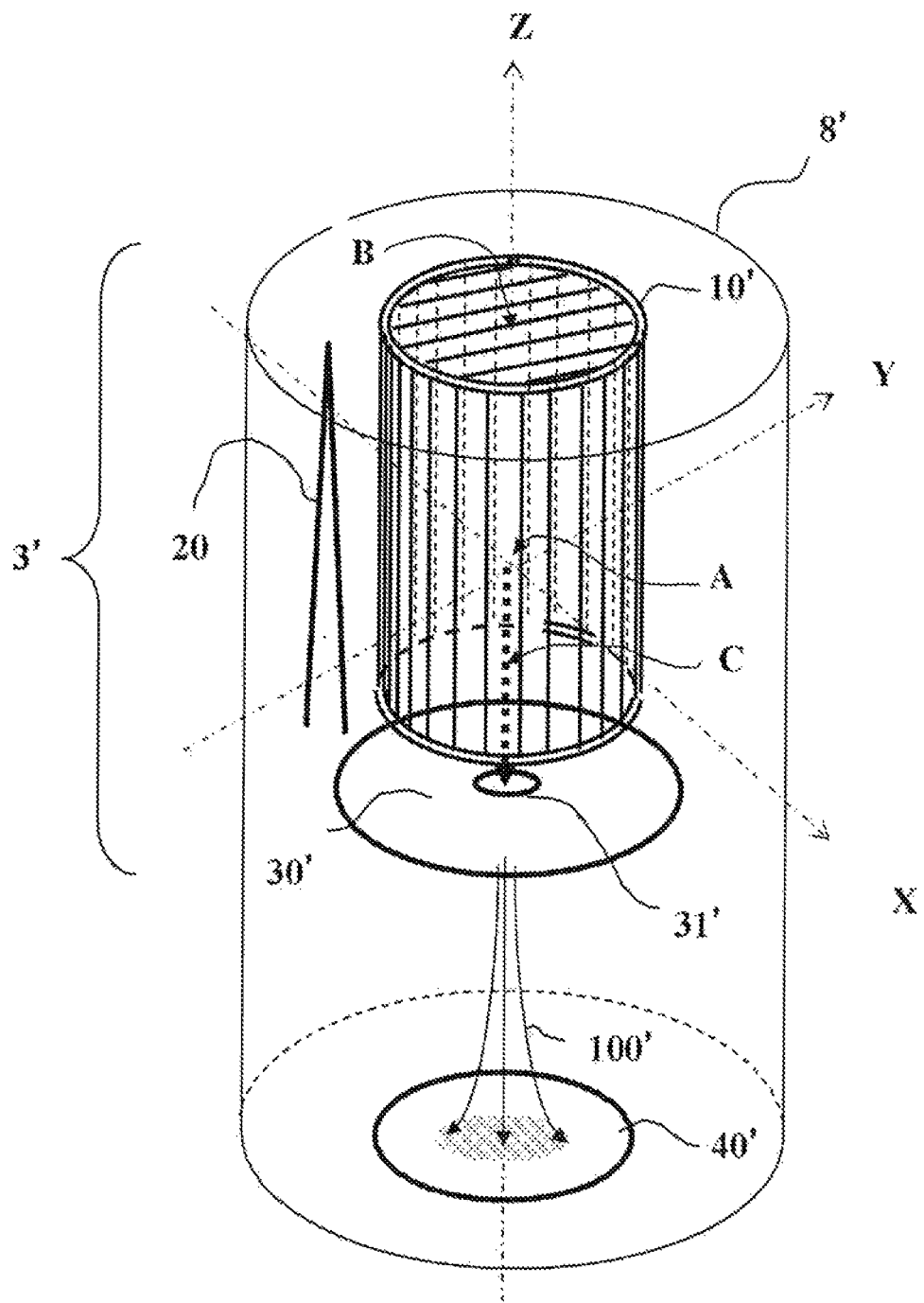
FIG. 19 illustrates a related art, and is a configuration diagram of a gauge head of the ion extractor ionization vacuum gauge including an ion source with a grid, a filament, and an ion extractor electrode.

FIG. 12 is an overall diagram of the vacuum measurement device 1 including an electronic circuit configured by using the gauge head of FIG. 9, and illustrates an arithmetic process between the current I1 from the primary collector and the current I2 from the secondary collector obtained from of the gauge head 2. A arithmetic circuit 206 calculates the normal total current IT=I1+I2 and the ratio I1/(I1+I2) from I1 and I2, a pressure display 207 displays a pressure P proportional to IT, and a ratio display 208 displays a ratio (%) of a specified gas with respect to the entire pressure I1+I2.

As described above, the vacuum measurement device of the embodiment is extremely reasonably configured as an ionization vacuum gauge capable of measuring a ratio of a specified gas. Furthermore, the structure of each component of this embodiment may be appropriately changed in design within the technical scope recited in the scope of claims, and of course, is not limited to the structure described in the drawings.

INDUSTRIAL APPLICABILITY

The invention may be appropriately used in a vacuum measurement device such as a mass spectrometer or an ionization vacuum gauge used to analyze a pressure and a residual gas of a vacuum device used in a fundamental research such as an accelerator science, a production technology, a development of various products such as a surface analyzer and an electron microscope, an industry for forming various films, and a semiconductor industry, to all of which the vacuum technology is essential.

DESCRIPTION OF REFERENCE NUMERALS

1: IONIZATION VACUUM GAUGE
2: GAUGE HEAD
3: ION SOURCE
10: GRID
11: ION OUTLET
20: ELECTRON SOURCE
30: ION EXTRACTOR ELECTRON
31: ION BEAM PASSAGE SLIT
38: DEFLECTOR ELECTRODE
40: ION COLLECTOR
50: SECONDARY ION COLLECTOR
100: ION BEAM

The invention claimed is:

1. A vacuum measurement device comprising:
a grid (10); and
an electron source (20) provided inside a vacuum vessel,
wherein the electron source (20) emits electrons to ionize gas molecules flying into the grid (10), so that an ion extractor electrode (30) extracts the ions as an ion beam (100) from an ion outlet (11) of the grid, and an ion collector (40) captures and converts the ion beam (100) into a current signal,
the grid (10) is formed in a substantially circular columnar cylinder or a polygonal columnar cylinder of more than a pentagonal shape so that the electrons emitted from the electron source pass therethrough,
the ion outlet (11) is opened and elongated in a longitudinal direction thereof along a side surface of the grid (10),
the ion outlet (11) is formed so that a longitudinal length of an opening is equal or substantially equal to a longitudinal length of the side surface of the grid (10),
the ion extractor electrode (30) includes an ion beam passage slit (31) through which the ion beam (100) passes,
the ion beam passage slit (31) is formed in a shape the same or substantially the same as that of the ion outlet (11),
the ion outlet (11) and the ion beam passage slit (31) are disposed to face each other with a gap in between so that the shapes thereof match each other,
the ion collector (40) is formed in a shape the same or substantially the same as that of the ion beam passage slit (31), and
the ion beam passage slit (31) and the ion collector (40) are disposed with a gap in between so that the shapes thereof match each other.

2. The vacuum measurement device according to claim 1, wherein a deflector electrode (38) capable of electrostatically deflecting the ion beam is disposed adjacent to the ion collector (40), and the grid (10) and the deflector electrode (38) are disposed so that an axis of the cylinder of the grid (10) and an axis of the deflector electrode (38) are parallel to each other.

3. A vacuum measurement device comprising:
a grid (10);
an electron source (20) provided inside a vacuum vessel;
an ion extractor electrode (30) that extracts ions as an ion beam (100) from an ion outlet (11) of the grid (10);
a primary ion collector (40) disposed at a position where specific ions among the ions converge; and
a secondary ion collector (50) that captures ions other than the specific ions,
wherein the grid (10) is formed in a substantially circular columnar cylinder or a polygonal columnar cylinder of more than a pentagonal shape so that the electrons emitted from the electron source pass therethrough, the ion outlet (11) is opened and elongated in a longitudinal direction thereof along a side surface of the grid (10), and the ion outlet (11) is formed so that a longitudinal length of an opening is equal or substantially equal to a longitudinal length of the side surface of the grid (10), and
the ion extractor electrode (30) includes an ion beam passage slit (31) through which the ion beam (100) passes, the ion beam passage slit (31) is formed in a shape the same or substantially the same as that of the ion outlet (11), the ion outlet (11) and the ion beam passage slit (31) are disposed to face each other with a gap in between so that the shapes thereof match each other, the ion collector (40) is formed in a shape the same or substantially the same as that of the ion beam passage slit (31), and the ion beam passage slit (31) and the ion collector (40) are disposed with gap in between so that the shapes thereof match each other.

4. The vacuum measurement device according to claim 3, wherein the secondary ion collector (50) has a surface for capturing the ions other than the specific ions three-dimensionally arranged to surround an orbit of an ion beam of the specific ions.

* * * * *